United States Patent
Yousef

(10) Patent No.: US 8,077,736 B2
(45) Date of Patent: Dec. 13, 2011

(54) FAST AUDIO/VISUAL RECEPTION IN DVB-H SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 890 days.

(21) Appl. No.: 12/036,389

(22) Filed: Feb. 25, 2008

(65) Prior Publication Data

US 2009/0213831 A1   Aug. 27, 2009

(51) Int. Cl.
*H04L 12/42* (2006.01)

(52) U.S. Cl. ........ 370/455; 370/352; 370/353; 370/354; 370/355; 370/356; 370/431; 370/449; 370/451; 370/452; 370/464; 370/480; 370/485; 370/486; 709/227; 709/228; 709/229; 709/231; 709/232; 725/143; 725/144; 725/145; 725/146; 725/147

(58) Field of Classification Search ................... 370/431, 370/449, 451, 452, 455, 464, 480, 485, 486
See application file for complete search history.

(56) References Cited

U.S. PATENT DOCUMENTS

| | | | |
|---|---|---|---|
| 2002/0026310 A1* | 2/2002 | Mochida et al. | 704/201 |
| 2003/0043784 A1* | 3/2003 | Selin | 370/352 |
| 2003/0152093 A1* | 8/2003 | Gupta et al. | 370/412 |
| 2003/0179752 A1* | 9/2003 | Grass | 370/394 |
| 2004/0259495 A1 | 12/2004 | Itoh et al. | |
| 2005/0007989 A1* | 1/2005 | Wittmann | 370/349 |
| 2006/0126667 A1 | 6/2006 | Smith et al. | |
| 2007/0189315 A1* | 8/2007 | Aoyanagi | 370/412 |
| 2007/0268883 A1* | 11/2007 | Quelle et al. | 370/349 |
| 2008/0133656 A1* | 6/2008 | Hashimoto | 709/203 |
| 2008/0232260 A1* | 9/2008 | Yeo et al. | 370/242 |
| 2009/0055540 A1* | 2/2009 | Foti et al. | 709/228 |
| 2009/0104871 A1* | 4/2009 | Cho | 455/3.04 |
| 2010/0189256 A1* | 7/2010 | Doehla et al. | 380/217 |
| 2010/0268761 A1* | 10/2010 | Masson | 709/203 |

* cited by examiner

*Primary Examiner* — Hassan Phillips
*Assistant Examiner* — Gautam Sharma
(74) *Attorney, Agent, or Firm* — Rahman LLC

(57) ABSTRACT

An apparatus and method of reducing a channel switching delay in TDM mobile television systems, and comprises receiving a data burst associated with channels for reception on a RF channel bandwidth received on a mobile television receiver, wherein the data burst comprises a plurality of RTP packets and a RTCP packet; buffering the data burst upon reception of a first RTP packet; synchronizing the buffered data burst to allow for reception of playable A/V data; and adjusting the synchronized buffered data burst upon reception of the RTCP packet. The method may further comprise performing the synchronizing upon reception of the RTCP packet. The method may further comprise inserting a null packet in the data burst prior to performing the buffering. The first RTP packet is preferably received prior to reception of the RTCP packet.

20 Claims, 8 Drawing Sheets

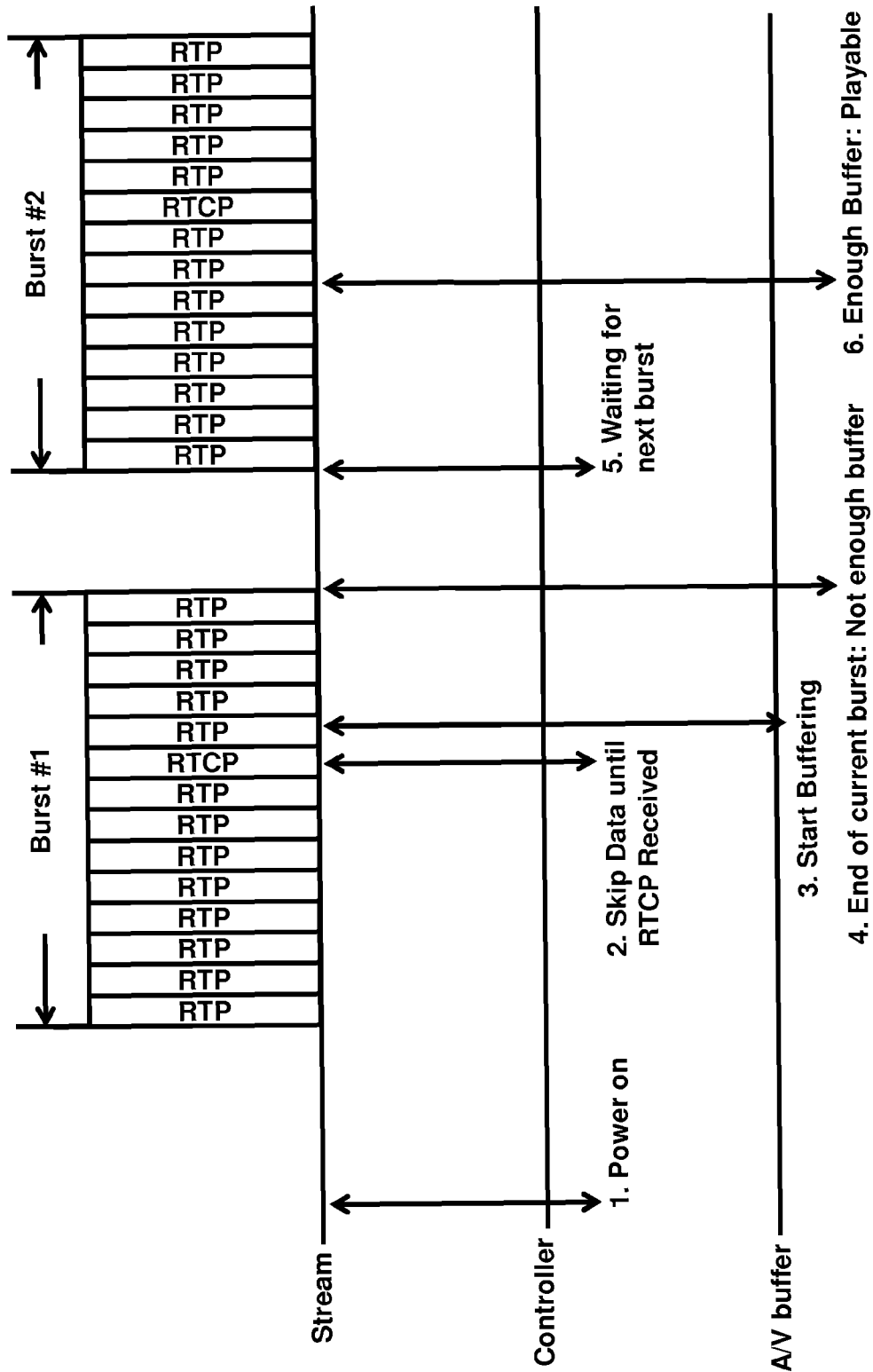

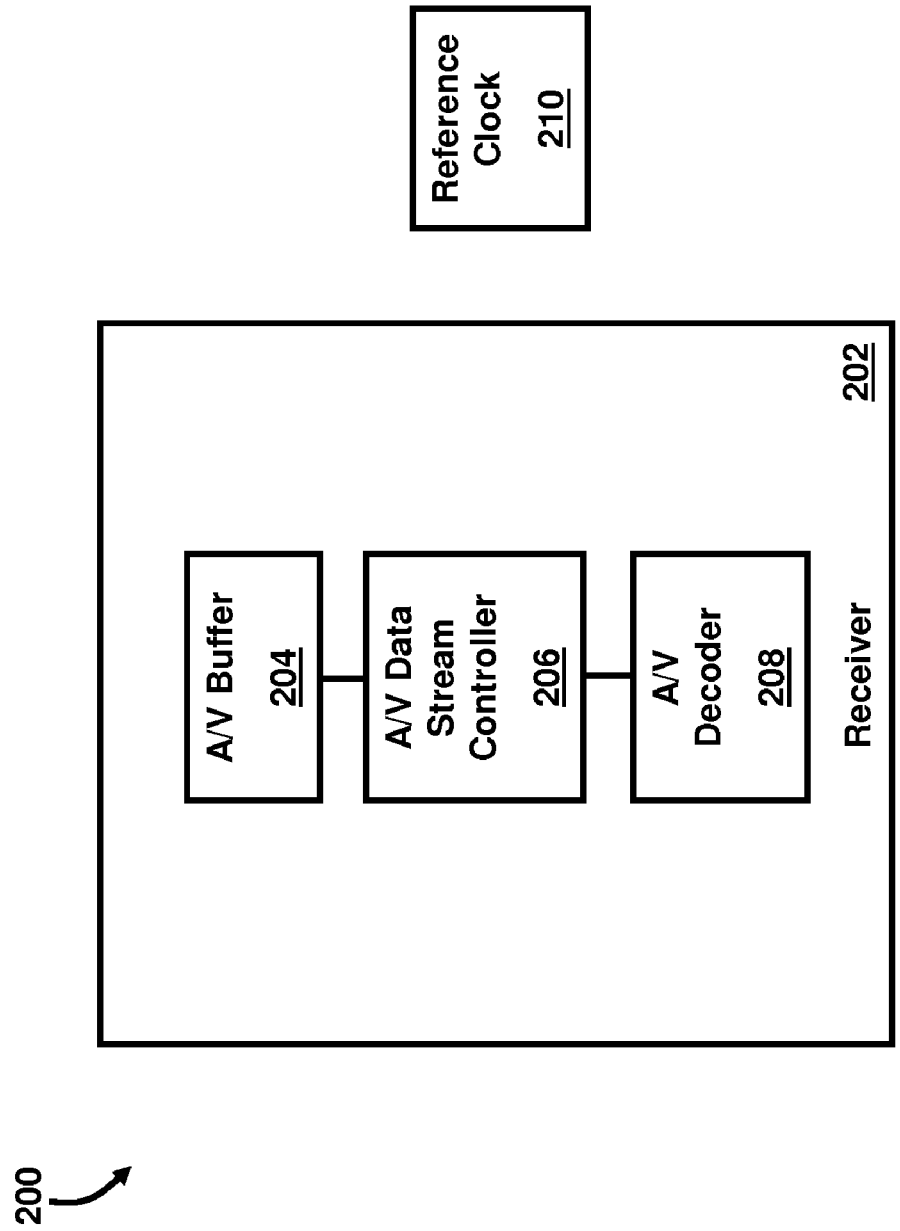

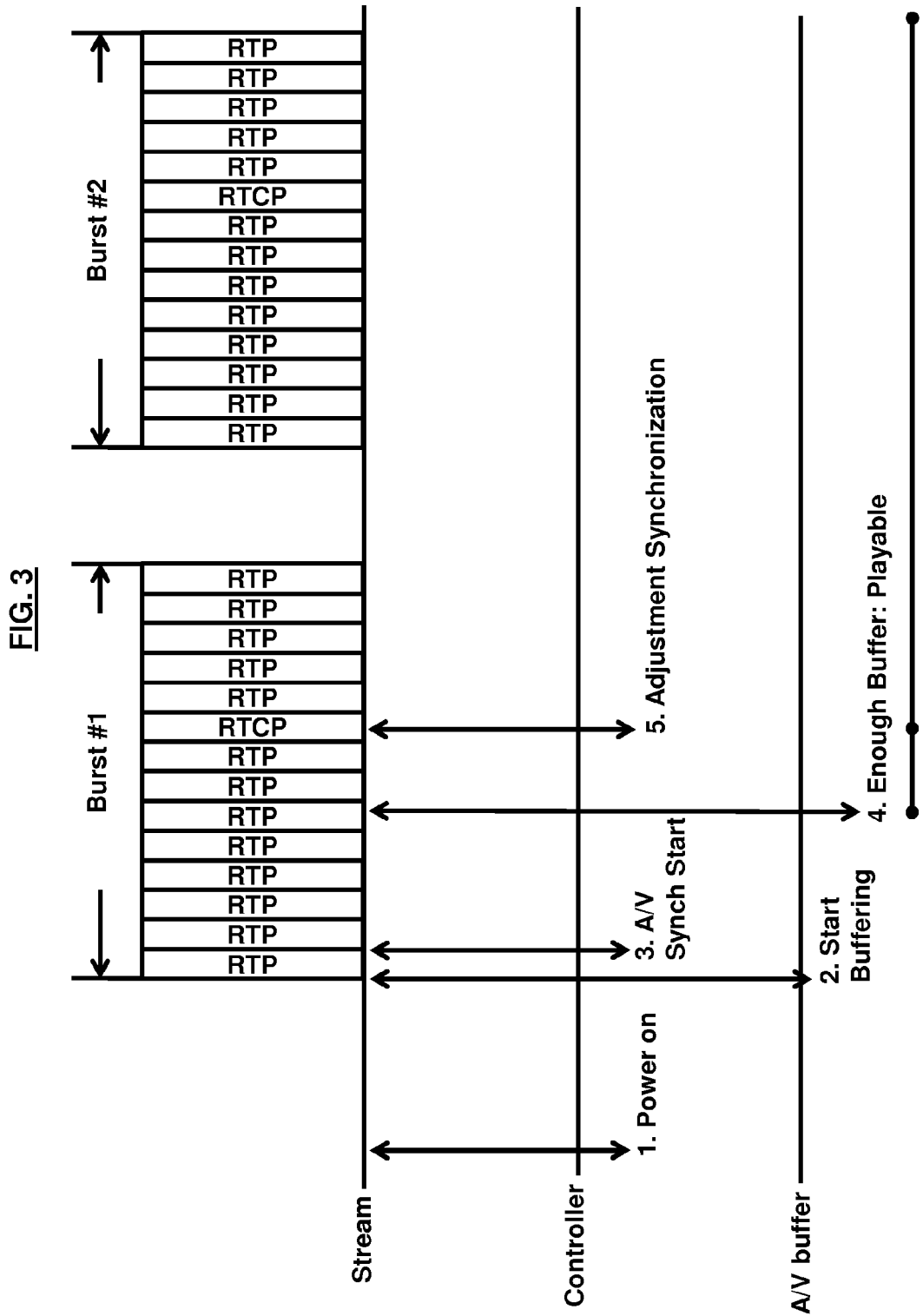

FAST AUDIO/VISUAL RECEPTION IN DVB-H SYSTEMS

BACKGROUND

1. Technical Field

The embodiments herein generally relate to mobile television (TV) technology, and, more particularly, to the transmission of and switching between television channels.

2. Description of the Related Art

Handheld devices with integrated digital television access are a relatively new phenomenon. Such technology has traditionally been limited by size, power consumption, and most importantly performance. Poor performance of such devices has typically been the result of the constantly changing receiver environment. More particularly, the quality of the received signal is affected by the device's ability to manage adjacent-channel rejection, low signal-to-noise ratios, and Doppler compensation, among other factors.

Digital Video Broadcasting-Handheld (DVB-H) is the specification for bringing broadcast services to handheld receivers, and was formally adopted as an ETSI (European Telecommunications Standards Institute) standard in November 2004. More specifically, DVB-H is a terrestrial digital TV standard that tends to consume less power than its predecessor, the Digital Video Broadcasting-Terrestrial (DVB-T) standard, and generally allows the receiver to move freely while receiving the signal transmission, thereby making it ideal for cellular phones and other mobile devices to receive digital TV broadcasting over the digiTV network, and hence without having to use cellular telephone networks.

In mobile TV systems such as DVB-H (ETSI EN 301 192), one radio frequency (RF) channel is shared among many TV channels (TV programs). Generally, these TV channels are multiplexed either in the time domain or in the frequency domain. When the TV channels are multiplexed in the time domain, each channel is given full access to the entire RF channel bandwidth for a short period of time (burst duration). After the burst is transmitted, bursts for other channels occupy the RF channel and so on. This multiplexing process is referred to as time division multiplexing (TDM). FIG. 1A illustrates an example of TDM of 15 TV channels on one RF channel. In FIG. 1, the TV channels are labeled 1, 2, 3, ..., 15. In FIG. 1A, it is shown that each TV channel occupies the entire RF channel for 1/15 of the total time. Generally, a receiver (not shown) which is receiving only one channel (for example, channel 2) only has to be active (ON) during the periods of channel 2 bursts. In order to conserve battery consumption, such a receiver will shut off its circuits when channel 2 bursts are not occupying the RF channel. Thus, the receiver enters into a SLEEP mode. This demonstrates that TDM of TV channels can help reduce power consumption of a receiver watching a single channel.

On the other hand, this tends to cause a problem when a user desires to switch to receive another TV channel on the same RF channel. One example is shown in FIG. 1A, if a user desires to switch from channel 2 (currently viewed channel (VIEW)) to channel 3 (this process is denoted by channel UP in FIG. 1A). The worst-case scenario occurs when a user issues a command to switch to channel 3 immediately after the burst of channel 3 ends. In this case, the receiver has to wait until the next burst that belongs to channel 3 appears on the RF channel. This causes a user to wait for a given period of time denoted as the channel switching delay. Such a delay could be as long as 5 to 7 seconds in DVB-H systems, which detracts from the television viewing process as such a channel switching delay could be rather annoying to a user.

Each DVB-H burst is composed of one real-time transport control protocol (RTCP) data packet and a number of real-time transport protocol (RTP) data packets as shown in FIG. 1B. RTP is used to transmit data (e.g., audio and video) and the RTCP is used to monitor quality of service (QoS). The monitoring of QoS is very important for modern applications. In large-scale applications (e.g. (Internet Protocol Television's (IPTV)), there is an unacceptable delay between RTCP reports, which can cause QoS related problems. It is clear from FIG. 1B that the receiver starts buffering data only when the RTCP packet is received, then the receiver will have to wait for the next burst to buffer enough RTP packets to be decoded. As a result generic audio and video (A/V) reception methods spend more than two seconds (burst time) to receive playable A/V data, which is a very long time leading to long switching delay, which results in reduced user satisfaction.

SUMMARY

In view of the foregoing, an embodiment herein provides a method of reducing a channel switching delay in TDM mobile television systems, and a program storage device readable by computer, tangibly embodying a program of instructions executable by the computer to perform the method of reducing a channel switching delay in TDM mobile television systems, wherein the method comprises receiving a data burst associated with channels for reception on a RF channel bandwidth received on a mobile television receiver, wherein the data burst comprises a plurality of RTP packets and a RTCP packet; buffering the data burst upon reception of a first RTP packet; synchronizing the buffered data burst to allow for reception of playable A/V data; and adjusting the synchronized buffered data burst upon reception of the RTCP packet.

The method may further comprise performing the synchronizing upon reception of the RTCP packet. Also, the method may further comprise inserting a null packet in the data burst prior to performing the buffering. Moreover, the data burst may comprise a DVB-H data burst. Additionally, the method may further comprise decoding the adjusted synchronized buffered data burst. Preferably, an entire data burst is received within a two-second period of time, and wherein the synchronizing process occurs within the two-second period of time. Furthermore, the first RTP packet is preferably received prior to reception of the RTCP packet.

Another embodiment provides an apparatus for reducing a channel switching delay in a TDM mobile television system, wherein the apparatus comprises a mobile television receiver adapted to receive a data burst associated with channels for reception on a RF channel bandwidth received on the mobile television receiver, wherein the data burst comprises a plurality of RTP packets and a RTCP packet; an A/V buffer adapted to buffer the data burst upon reception of a first RTP packet; and an A/V data stream controller adapted to synchronize the buffered data burst to allow for reception of playable A/V data, and adjust the synchronized buffered data burst upon reception of the RTCP packet.

The A/V data stream controller may be adapted to synchronize the buffered data burst upon reception of the RTCP packet. Moreover, the apparatus may further comprise an A/V decoder adapted to insert a null packet in the data burst prior to performing the buffering. Additionally, the data burst may comprise a DVB-H data burst. Also, the apparatus may further comprise an A/V decoder adapted to decode the adjusted synchronized buffered data burst. Preferably, an entire data burst is received within a two-second period of time, wherein the synchronizing process occurs within the two-second period of time, and wherein the first RTP packet is received prior to reception of the RTCP packet.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1B is a schematic diagram illustrating conventional A/V reception;

FIG. 2 illustrates a block diagram of an apparatus according to an embodiment herein;

FIG. 3 is a schematic diagram illustrating buffered A/V reception according to an embodiment herein;

DETAILED DESCRIPTION OF PREFERRED EMBODIMENTS

Figure 1A:
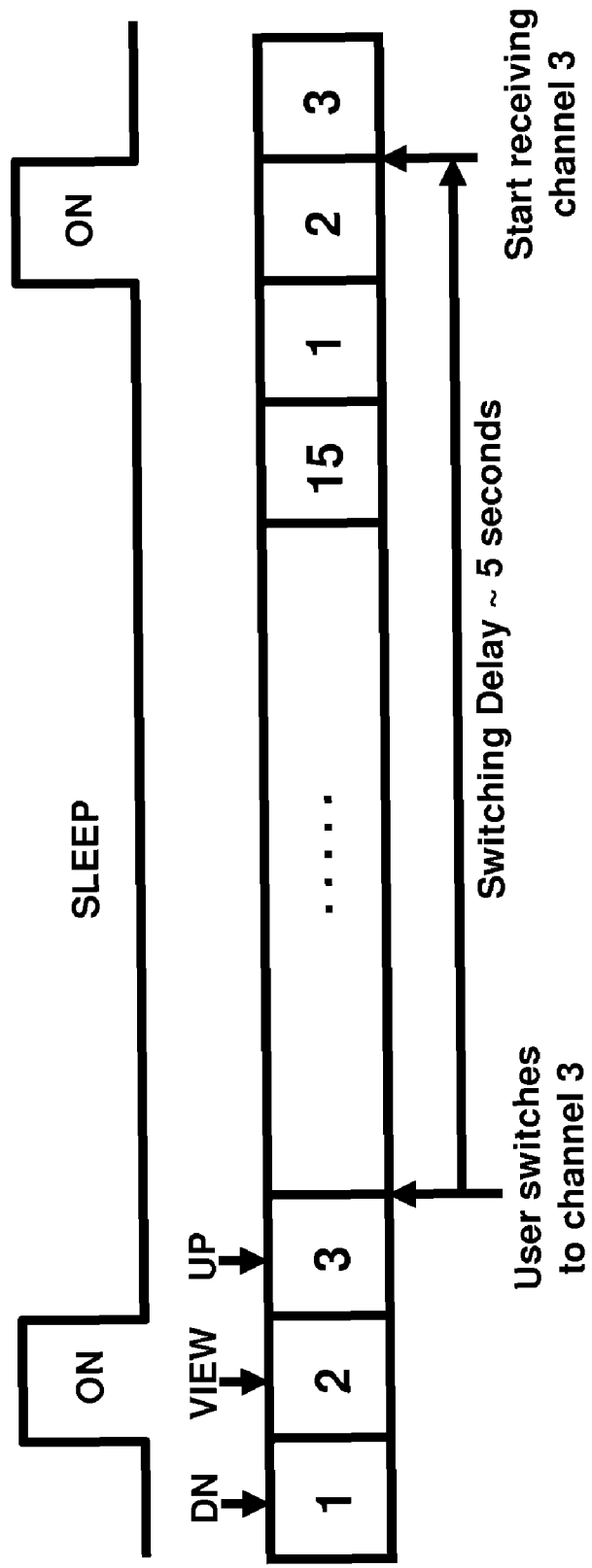
FIG. 1A is a schematic diagram illustrating channel switching delay in conventional TDM systems.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Generally, the embodiments herein provide techniques for providing fast A/V reception in DVB-H systems by reducing the channel switching delay in TDM mobile TV systems. Referring now to the drawings, and more particularly to FIGS. 2 through 7, where similar reference characters denote corresponding features consistently throughout the figures, there are shown preferred embodiments.

FIG. 2 illustrates an apparatus 200 for reducing a channel switching delay in a TDM mobile television system according to an embodiment herein, wherein the apparatus 200 comprises a mobile television receiver 202 adapted to receive a data burst associated with channels for reception on a RF channel bandwidth received on the mobile television receiver 202, wherein the data burst comprises a plurality of RTP packets and a RTCP packet; an A/V buffer 204 adapted to buffer the data burst upon reception of a first RTP packet; and an A/V data stream controller 206 adapted to synchronize the buffered data burst to allow for reception of playable A/V data, and adjust the synchronized buffered data burst upon reception of the RTCP packet.

The A/V data stream controller 206 may be adapted to synchronize the buffered data burst upon reception of the RTCP packet. Moreover, the apparatus 200 may further comprise an A/V decoder 208 adapted to insert a null packet in the data burst prior to performing the buffering. Additionally, the data burst may comprise a DVB-H data burst. Also, the apparatus 200 may further comprise an A/V decoder 208 adapted to decode the adjusted synchronized buffered data burst. Preferably, an entire data burst is received within a two-second period of time, wherein the synchronizing process occurs within the two-second period of time, and wherein the first RTP packet is received prior to reception of the RTCP packet.

FIG. 3, with reference to FIG. 2, is a schematic diagram illustrating buffered A/V reception according to an embodiment herein. As illustrated in FIG. 3, the receiver 202 is first powered on, then upon receipt of the first data burst (Burst #1), and more specifically, upon receipt of the first RTP data packet in the first data burst, the buffering process begins. Thereafter, the A/V synchronization process begins upon receipt of the second RTP data packet (i.e., conclusion of the first RTP data packet). Between the time of the sixth RTP data packet and receipt of the RTCP data packet, there is sufficient buffered data to provide playable A/V data (i.e., to allow for A/V reception). This is due to the A/V synchronization that has previously occurred. Finally, when the RTCP data packet is received, an adjustment is made to the synchronization process.

As shown in FIG. 3, buffered data is non-synchronized data before the RTCP packet is received. The pre-synchronization process utilizes the timestamp information in the RTP packet. The timestamp in each RTP packet is used to place the incoming audio and video packets in the correct timing order (payout delay compensation) for the buffered RTP packets. However, RTP timestamps from different media streams may advance at different rates and usually have independent, random offsets. Therefore, although these timestamps are sufficient to reconstruct the timing of a single stream, directly comparing RTP timestamps from different media is not effective for synchronization. Instead, for each medium the RTP timestamp is related to the sampling instant by pairing it with a timestamp from a reference clock (i.e., wall clock) 210 that represents the time when the data corresponding to the RTP timestamp was sampled. The reference clock 210 is shared by all media to be synchronized. The timestamp pairs are not transmitted in every data packet, but at a lower rate in the RTCP packets.

The overall synchronization process is a two-step process of pre-synchronization and adjustment. According to this embodiment, synchronization is performed in one data burst only (lasting approximately two seconds) thereby resulting in a much quicker synchronization period than the conventional techniques. The RTP packets contain a timestamp which reflects the sampling instant of the first octet in the RTP data packet. By mapping between such a timestamp and a globally synchronized clock 210, carried as RTCP timestamp mappings called the network time protocol (NTP) and the RTP timestamps within the RTCP packet, these timestamps complete the synchronization process.

Figure 4:
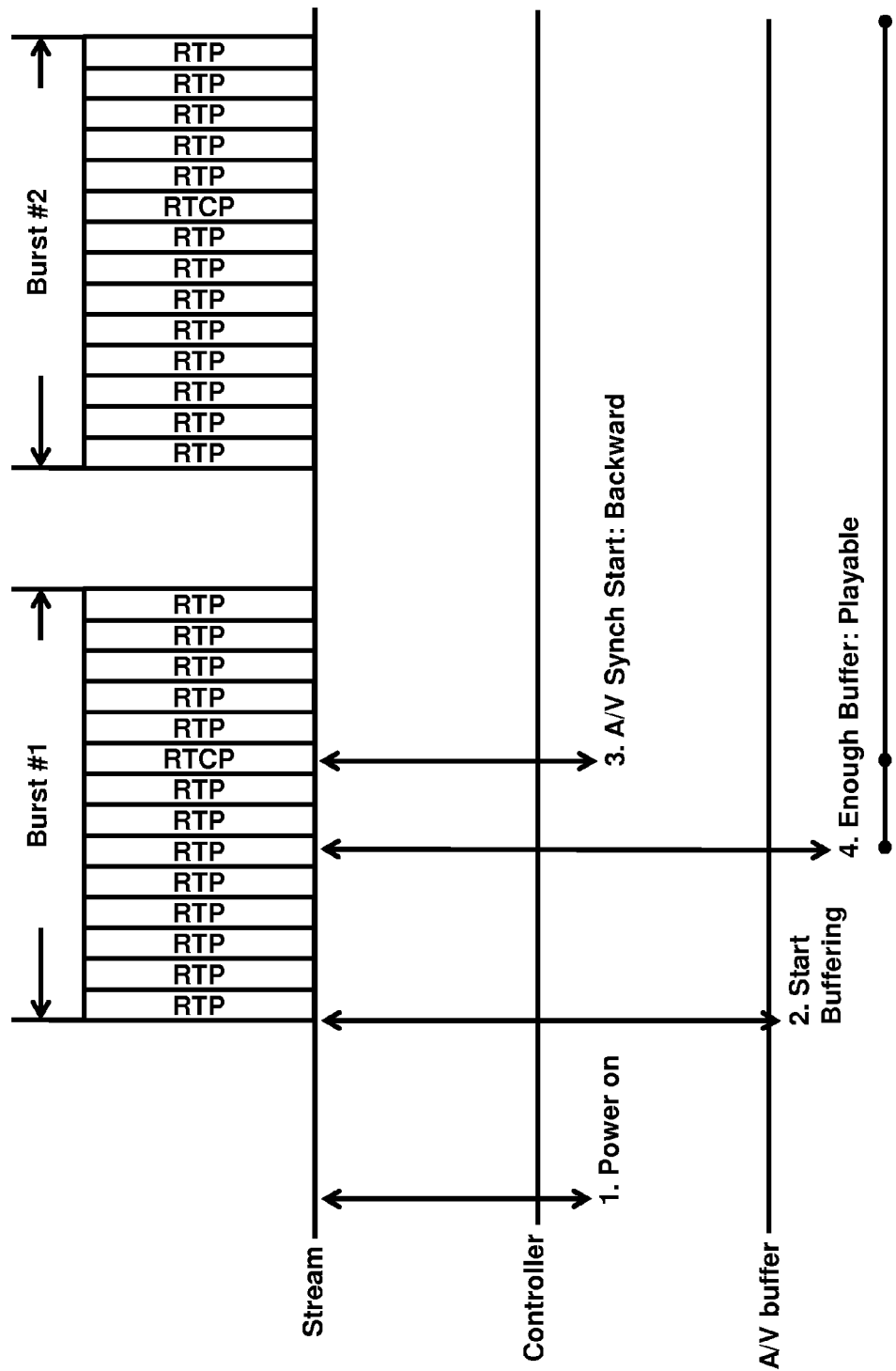
FIG. 4 is a schematic diagram illustrating buffered A/V reception with backward synchronization according to an embodiment herein.

FIG. 4, with reference to FIG. 2, is a schematic diagram illustrating buffered A/V reception with backward synchronization according to an embodiment herein. In this embodiment backward synchronization is performed such that when the RTCP packet is received, the A/V controller 206 synchronizes the buffered data and plays the A/V data when full synchronization occurs. As soon as the RTCP packet is received, mapping is performed between its timestamp and all the buffered RTP data packets to ensure that they are synchronized to the reference clock 210; this is referred to as backward synchronization.

As illustrated in FIG. 4, the receiver 202 is first powered on, then upon receipt of the first data burst (Burst #1), and more specifically, upon receipt of the first RTP data packet in the first data burst, the buffering process begins. Between the time of the sixth RTP data packet and receipt of the RTCP data packet, there is sufficient buffered data to provide playable A/V data (i.e., to allow for A/V reception). This is due to the A/V backward synchronization that occurs upon receipt of the RTCP data packet.

Figure 5:
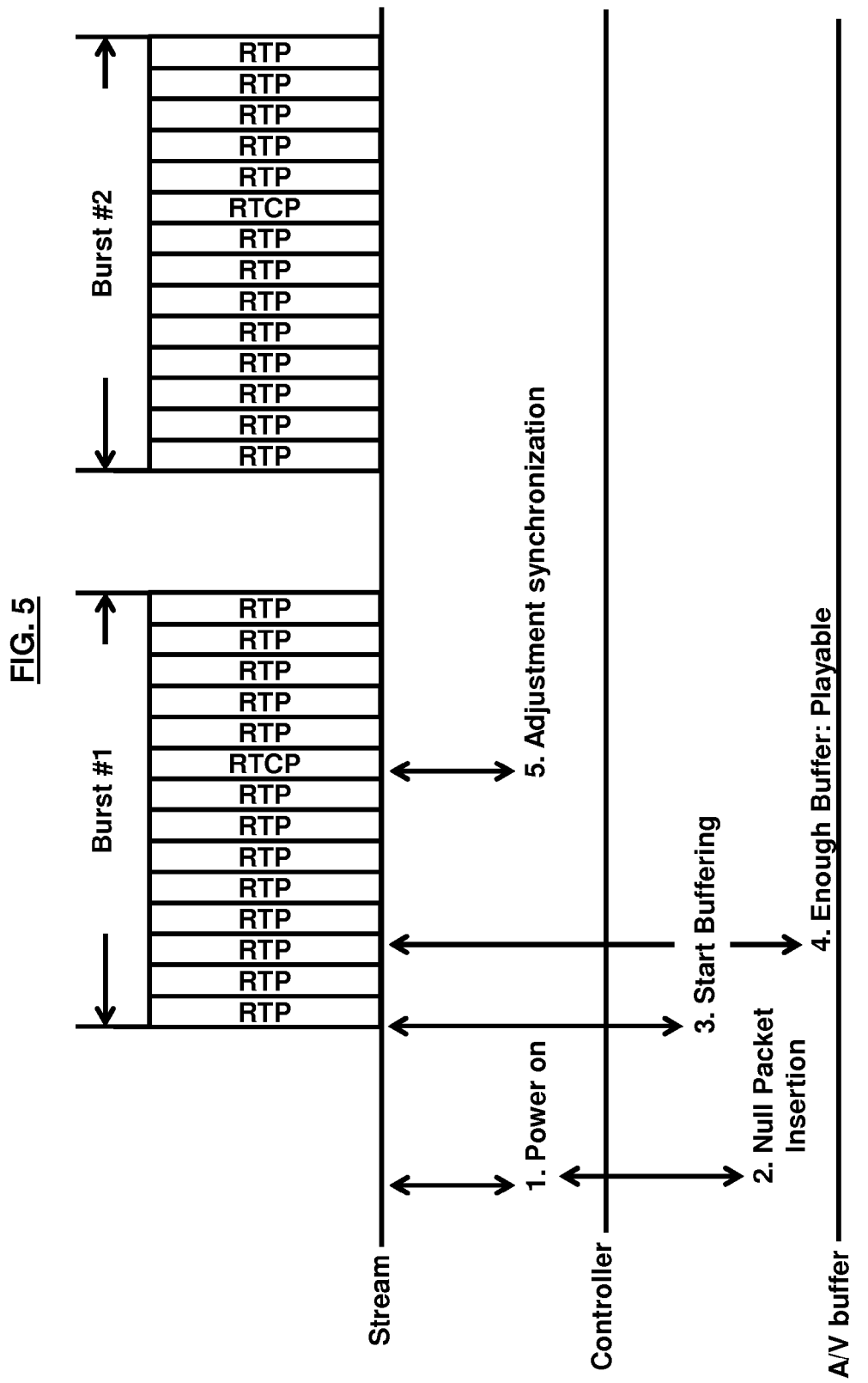
FIG. 5 is a schematic diagram illustrating buffered A/V reception with packet control according to an embodiment herein.

FIG. 5, with reference to FIG. 2, is a schematic diagram illustrating buffered A/V reception with packet control according to an embodiment herein. Generally, the A/V decoder 208 requires enough buffer data for approximately a couple of hundred milliseconds. But this feature makes A/V reception slower. Because the system is buffering the data stream with enough time, another buffering task is not required. As such, in this embodiment, the A/V data reception time can be shortened significantly (i.e., by three RTP packets) by inserting a null-packet into the A/V decoder.

As illustrated in FIG. 5, the receiver 202 is first powered on. Shortly thereafter, null packet insertion occurs. Then, upon receipt of the first data burst (Burst #1), and more specifically, upon receipt of the first RTP data packet in the first data burst, the buffering process begins. Between the time of the third RTP data packet and receipt of the RTCP data packet, there is sufficient buffered data to provide playable A/V data (i.e., to allow for A/V reception). This is due to the null packet insertion that has previously occurred. Finally, when the RTCP data packet is received, an adjustment is made to the synchronization process.

Figure 6:
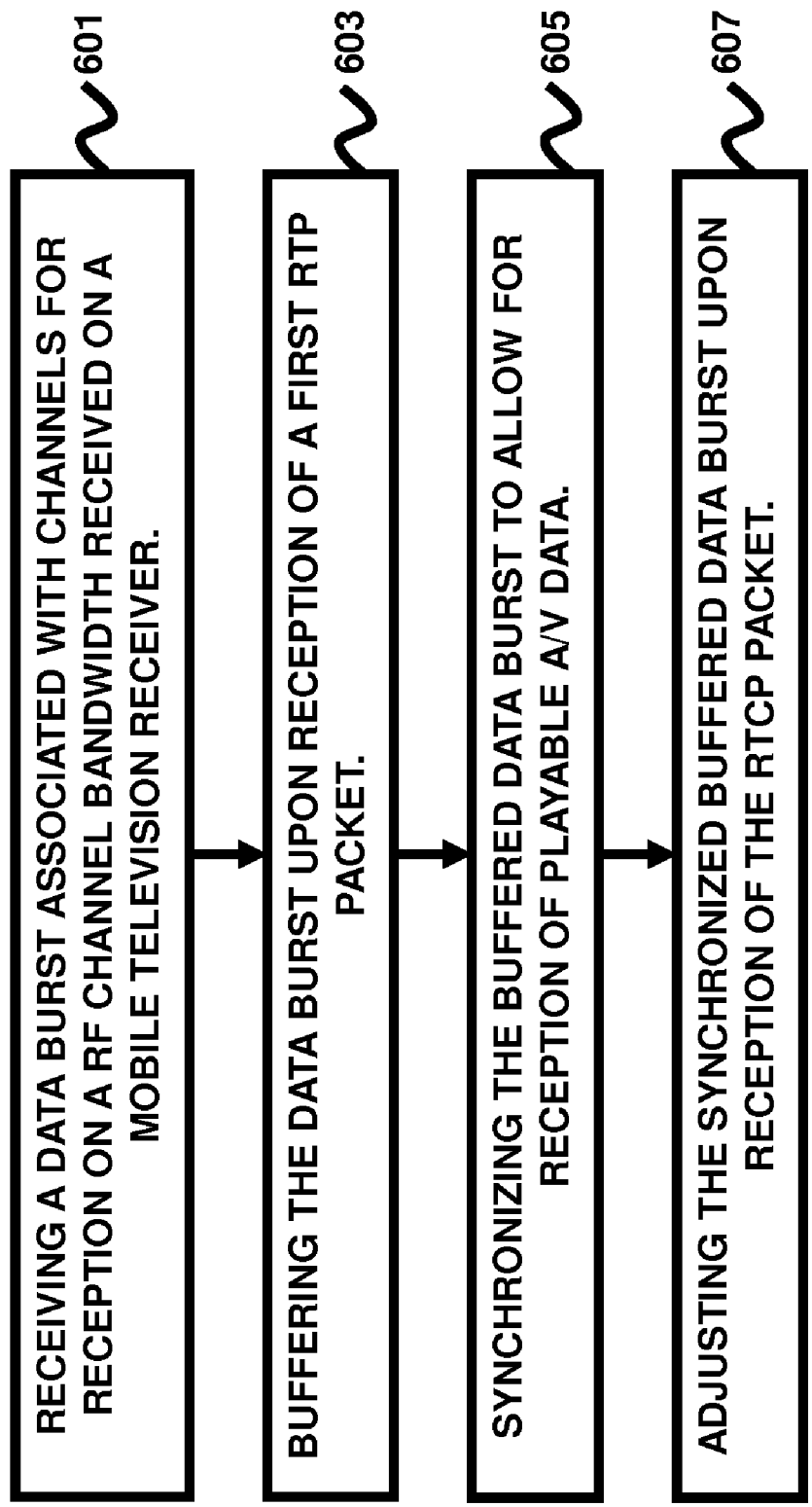
FIG. 6 is a flow diagram illustrating a preferred method of an embodiment herein.

FIG. 6, with reference to FIGS. 2 through 5, illustrates a flow diagram of a method of reducing a channel switching delay in TDM mobile television systems according to an embodiment herein, wherein the method comprises receiving (601) a data burst associated with channels for reception on a RF channel bandwidth received on a mobile television receiver 202, wherein the data burst comprises a plurality of RTP packets and a RTCP packet; buffering (603) the data burst upon reception of a first RTP packet; synchronizing (605) the buffered data burst to allow for reception of playable A/V data; and adjusting (607) the synchronized buffered data burst upon reception of the RTCP packet.

The method may further comprise performing the synchronizing (605) upon reception of the RTCP packet. Also, the method may further comprise inserting a null packet in the data burst prior to performing the buffering (603). Moreover, the data burst may comprise a DVB-H data burst. Additionally, the method may further comprise decoding the adjusted synchronized buffered data burst. Preferably, an entire data burst is received within a two-second period of time, and wherein the synchronizing process (605) occurs within the two-second period of time. Furthermore, the first RTP packet is preferably received prior to reception of the RTCP packet.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
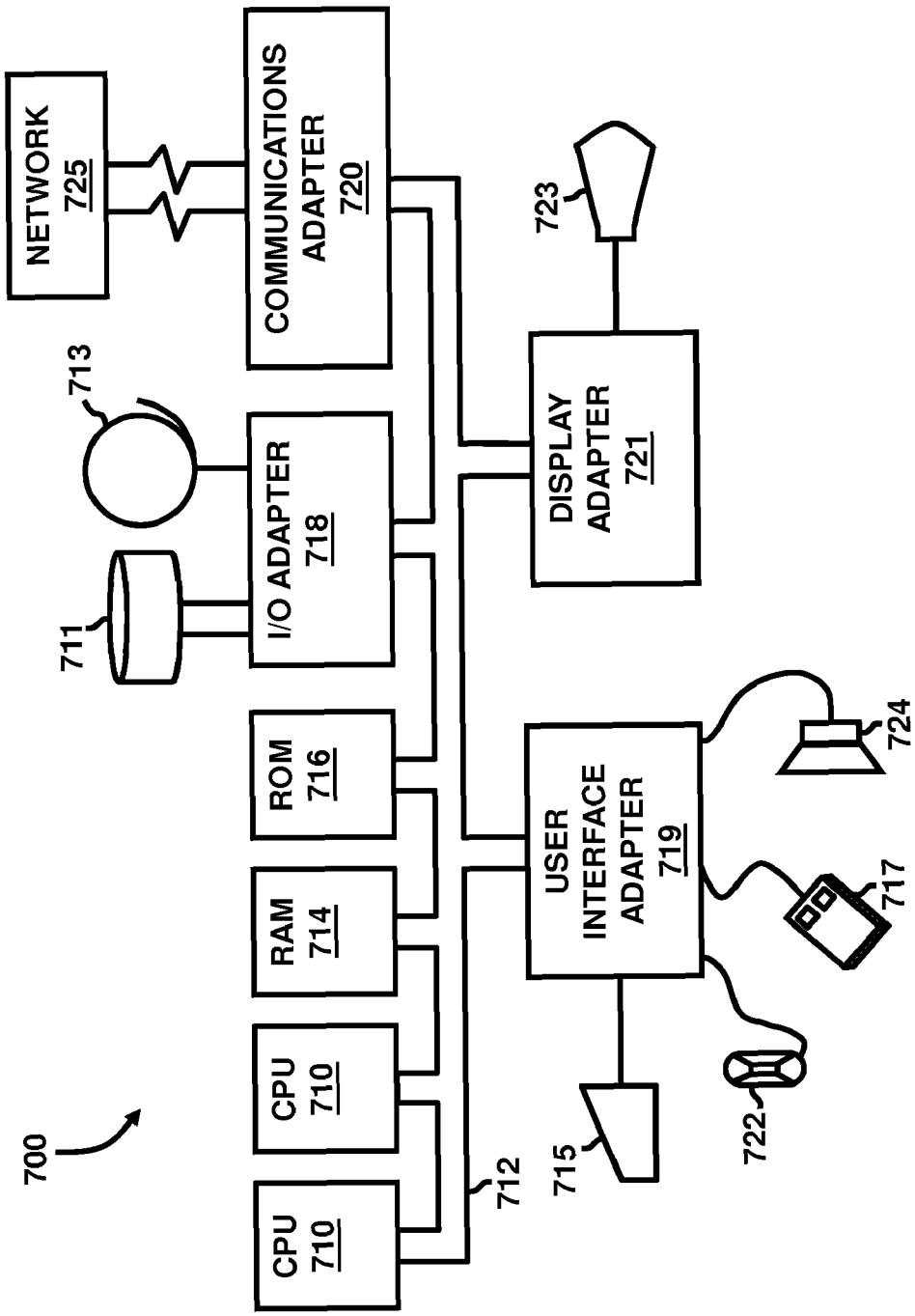
FIG. 7 is a computer hardware diagram according to an embodiment herein.

A representative hardware environment for practicing the embodiments herein is depicted in FIG. 7. This schematic drawing illustrates a hardware configuration of an information handling/computer system 700 in accordance with the embodiments herein. The system 700 comprises at least one processor or central processing unit (CPU) 710. The CPUs 710 are interconnected via system bus 712 to various devices such as a random access memory (RAM) 714, read-only memory (ROM) 716, and an input/output (I/O) adapter 718. The I/O adapter 718 can connect to peripheral devices, such as disk units 711 and tape drives 713, or other program storage devices that are readable by the system 700. The system 700 can read the inventive instructions on the program storage devices and follow these instructions to execute the methodology of the embodiments herein. The system 700 further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 connects the bus 712 to a data processing network 725, and a display adapter 721 connects the bus 712 to a display device 723 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of reducing a channel switching delay in time division multiplexing (TDM) mobile television systems, said method comprising:
   receiving a data burst associated with channels for reception on a radio frequency (RF) channel bandwidth received on a mobile television receiver, wherein said data burst comprises a plurality of real-time transport protocol (RTP) packets and a real-time transport control protocol (RTCP) packet;
   buffering said data burst upon reception of a first RTP packet;
   synchronizing the buffered data burst to allow for reception of playable audio/visual (A/V) data; and
   adjusting the synchronized buffered data burst upon reception of said RTCP packet.

2. The method of claim 1, further comprising performing the synchronizing upon reception of said RTCP packet.

3. The method of claim 1, further comprising inserting a null packet in said data burst prior to performing the buffering.

4. The method of claim 1, wherein said data burst comprises a Digital Video Broadcasting-Handheld (DVB-H) data burst.

5. The method of claim 1, further comprising decoding the adjusted synchronized buffered data burst.

6. The method of claim 1, wherein an entire data burst is received within a two-second period of time, and wherein the synchronizing process occurs within said two-second period of time.

7. The method of claim 1, wherein said first RTP packet is received prior to reception of said RTCP packet.

8. A program storage device readable by computer, tangibly embodying a program of instructions executable by said computer to perform a method of reducing a channel switching delay in time division multiplexing (TDM) mobile television systems, said method comprising:
   receiving a data burst associated with channels for reception on a radio frequency (RF) channel bandwidth received on a mobile television receiver, wherein said data burst comprises a plurality of real-time transport protocol (RTP) packets and a real-time transport control protocol (RTCP) packet;
   buffering said data burst upon reception of a first RTP packet;
   synchronizing the buffered data burst to allow for reception of playable audio/visual (A/V) data; and
   adjusting the synchronized buffered data burst upon reception of said RTCP packet.

9. The program storage device of claim 8, further comprising performing the synchronizing upon reception of said RTCP packet.

10. The program storage device of claim 8, further comprising inserting a null packet in said data burst prior to performing the buffering.

11. The program storage device of claim 8, wherein said data burst comprises a Digital Video Broadcasting-Handheld (DVB-H) data burst.

12. The program storage device of claim 8, further comprising decoding the adjusted synchronized buffered data burst.

13. The program storage device of claim 8, wherein an entire data burst is received within a two-second period of time, and wherein the synchronizing process occurs within said two-second period of time.

14. The program storage device of claim 8, wherein said first RTP packet is received prior to reception of said RTCP packet.

15. An apparatus for reducing a channel switching delay in a time division multiplexing (TDM) mobile television system, said apparatus comprising:
   a mobile television receiver that receives a data burst associated with channels for reception on a radio frequency (RF) channel bandwidth received on said mobile television receiver, wherein said data burst comprises a plurality of real-time transport protocol (RTP) packets and a real-time transport control protocol (RTCP) packet;
   an audio/visual (A/V) buffer that buffers said data burst upon reception of a first RTP packet; and
   an A/V data stream controller that synchronizes the buffered data burst to allow for reception of playable A/V data, and adjust the synchronized buffered data burst upon reception of said RTCP packet.

16. The apparatus of claim 15, wherein said A/V data stream controller synchronizes said buffered data burst upon reception of said RTCP packet.

17. The apparatus of claim 15, further comprising an A/V decoder that inserts a null packet in said data burst prior to performing the buffering.

18. The apparatus of claim 15, wherein said data burst comprises a Digital Video Broadcasting-Handheld (DVB-H) data burst.

19. The apparatus of claim 15, further comprising an A/V decoder that decodes the adjusted synchronized buffered data burst.

20. The apparatus of claim 15, wherein an entire data burst is received within a two-second period of time, wherein the synchronizing process performed by said A/V data stream controller occurs within said two-second period of time, and wherein said first RTP packet is received prior to reception of said RTCP packet.

* * * * *